(No Model.)
T. B. TINNEY.
CAROUSEL.
No. 596,342. Patented Dec. 28, 1897.
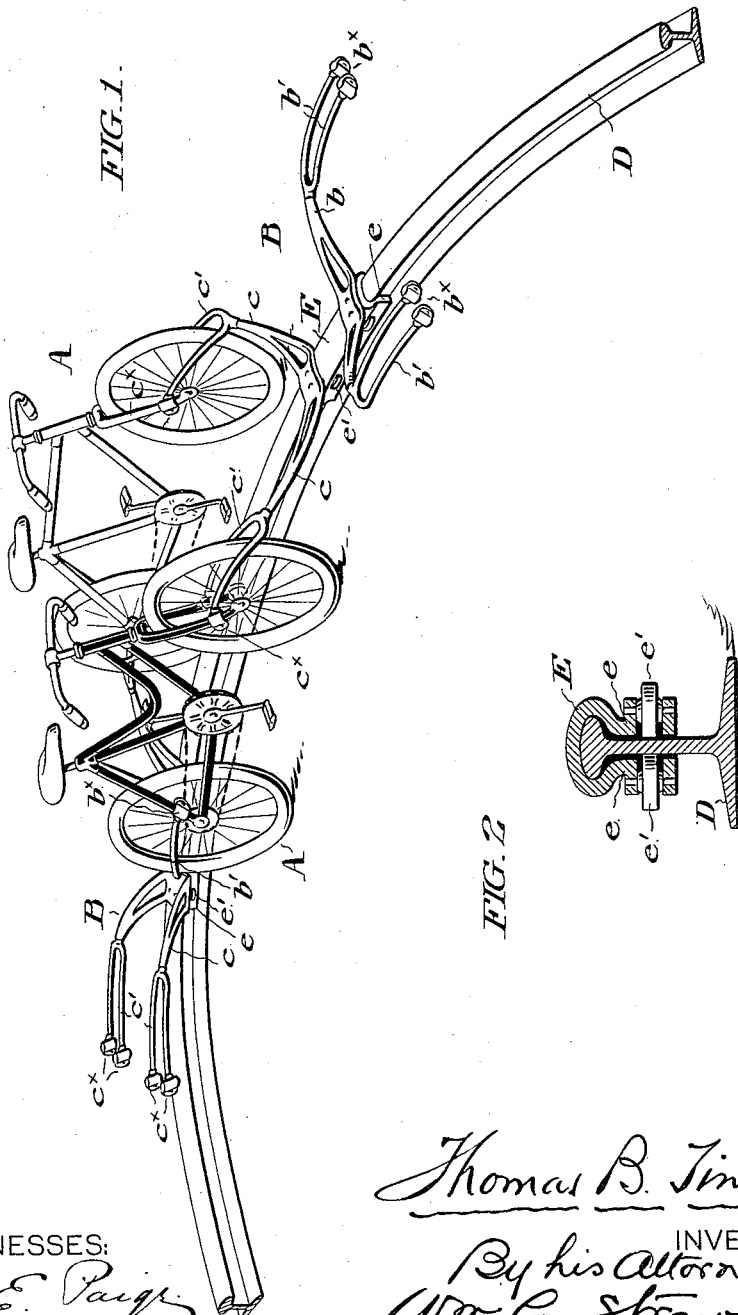
WITNESSES:
N. E. Paige
F. Norman Dixon
INVENTOR:
Thomas B. Tinney
By his Attorneys,
Wm. C. Strawbridge
J. Bonsall Taylor

UNITED STATES PATENT OFFICE.

THOMAS B. TINNEY, OF PHILADELPHIA, PENNSYLVANIA.

CAROUSEL.

SPECIFICATION forming part of Letters Patent No. 596,342, dated December 28, 1897.

Application filed April 2, 1897. Serial No. 630,362. (No model.)

*To all whom it may concern:*

Be it known that I, THOMAS B. TINNEY, a citizen of the United States, residing in the city and county of Philadelphia, in the State of Pennsylvania, have invented certain new and useful Improvements in Carousels, of which the following is a specification.

It is the object of my invention to provide a carousel so constructed that the conveyance on which the riders are carried is a bicycle or bicycle-like wheeled vehicle, in which the rider is seated upon a saddle with his feet resting upon pedals which rotate in unison with the wheels as the vehicle travels, by the use of which carousel persons unskilled in the riding of bicycles may with safety receive a practical demonstration, in part, of the sensation of bicycle riding, and become habituated to the attitude and motions incident to the riding of bicycles.

In the accompanying drawings I show and herein I describe a good form of a convenient embodiment of my invention, the particular subject-matter claimed as novel being hereinafter definitely specified.

In the accompanying drawings,

Figure 1 is a view in perspective of so much of a carousel embodying a good form of my invention, as is necessary for the understanding of the complete structure.

Figure 2 is a transverse section through a spider frame and the guide rail.

A A indicate bicycles or bicycle-like vehicles of any preferred and convenient form and arrangement, of which either a single or double circular series may be arranged to travel around the path or circle of the carousel.

I prefer to employ a double series, as indicated in the accompanying drawings, but my invention is not restricted to the employment of such double series.

B B are spider frames which, in the form shown, connect each pair of bicycles with the pair of bicycles next in front, and the pair of bicycles next in the rear, respectively.

The arrangement indicated is continuous throughout the whole double series of bicycles employed, the chain of bicycles and frames extending completely around the track, each pair of bicycles being connected to the pair in front and to the pair behind.

I prefer to employ as the means for connecting the bicycles together in the manner indicated, the particular form of spider frames, shown somewhat in detail in Figure 1, said spider frame being a four-armed structure, the central part of which constitutes a follower adapted to embrace a fixed guide rail.

The two front arms $b\ b$ of each spider frame are adapted for attachment to the frames of the two bicycles ahead of it, and the two rear arms $c\ c$ are adapted for attachment to the frames of a pair of bicycles to the rear of it.

Each of the arms $b$ is provided with or formed as a fork, the prongs of which, $b'\ b'$, are adapted to pass respectively to the respective sides of the rear wheel of the bicycle with which said arm is connected, and the extremities of said prongs are provided with clamps $b^\times\ b^\times$ of any preferred construction, adapted to be secured upon the rear fork of the bicycle frame.

The rearwardly extending arms $c\ c$ are formed as or provided with forks, the prongs $c'\ c'$ of which pass respectively to the respective sides of the front wheels of the bicycles to which said arms are connected, and the extremities of said prongs are provided with clamps $c^\times$ adapted to be secured to the front forks of said bicycles.

The bicycles being thus connected together in series of pairs by the spider frames referred to, it is desirable to supply a guide by which they will in their travel be caused to move in a circle or other predetermined figure, and this may be accomplished, of course, in a variety of ways.

I prefer, however, to employ a continuous guide rail D, extending longitudinally between the respective pairs of bicycles, and adapted to guide the bicycles through being engaged by the spider frames referred to.

To this end the rail D is made in the form, sectionally, of an ordinary railroad rail, and the spider is provided with a follower plate E, having depending flanges $e\ e$, said plate E extending across the head of the rail, and the flanges $e\ e$ being bent inwardly, so as to engage beneath said head.

The plate E constitutes, in the form shown, part of the spider.

Other arrangements of plates to engage the rail may of course be resorted to.

Preferably the depending flanges or plates $e\ e$ are provided with anti-friction rolls $e'\ e'$ as shown in Figure 2.

The connected series of bicycle vehicles, thus or otherwise mounted and arranged, may be driven by any usual propelling engine or mechanical driving apparatus, illustration of which is deemed unnecessary,—or the carousel be caused to travel solely through the efforts or motions of the riders of the vehicles, but, while I prefer the latter arrangement, as one best adapted to place the rider in the situation of an ordinary bicycle rider, I do not restrict myself to this arrangement.

Having thus described my invention, I claim—

1. The combination to form a carousel, of a permanent guide rail, a series of bicycles or bicycle-like vehicles, a series of frames alternated with said vehicles, and each frame connected to the vehicle in front of and to the rear of it, and guide plates connected to said frames, and engaged with said rail, substantially as set forth.

2. The combination, to form a carousel, of a guide rail, a number of bicycles or bicycle-like vehicles disposed in two tandem series, one series on each side of said rail, and spider frames mounted and adapted to travel upon said rail, and having arms which extend rearwardly, and engage with the frames of two bicycles in the rear, one in the outer and one in the inner series, and two arms which extend forwardly, and engage with the frames of two bicycles in front, one in the outer and one in the inner series, substantially as set forth.

In testimony that I claim the foregoing as my invention I have hereunto signed my name this 30th day of March, A. D. 1897.

THOMAS B. TINNEY.

In presence of—
F. NORMAN DIXON,
THOS. K. LANCASTER.